United States Patent
Reichkitzer et al.

[11] Patent Number: 6,013,300
[45] Date of Patent: Jan. 11, 2000

[54] QUICK BREAD

[75] Inventors: Tamara A. Reichkitzer, Battle Creek; Charles Smith, Marshall; Gerry I. Johnson, Battle Creek; Gilles G. Renusson, Jenison, all of Mich.

[73] Assignee: Kellogg Company, Battle Creek, Mich.

[21] Appl. No.: 08/972,903

[22] Filed: Nov. 18, 1997

Related U.S. Application Data

[63] Continuation-in-part of application No. 08/749,681, Nov. 15, 1996, abandoned.

[51] Int. Cl.[7] .................................................... A21D 10/04
[52] U.S. Cl. ........................... 426/552; 426/94; 426/138; 426/496; 426/505; 426/523
[58] Field of Search ..................... 426/275, 496, 426/502, 503, 505, 523, 128, 138, 249, 94, 552; 249/DIG. 1, 117; 99/426, 430, 372, 439

[56] References Cited

U.S. PATENT DOCUMENTS

| | | |
|---|---|---|
| 3,753,734 | 8/1973 | Kaplow et al. |
| 3,767,823 | 10/1973 | Wheeler et al. |
| 3,769,035 | 10/1973 | Kleiner et al. |
| 3,975,550 | 8/1976 | Fioriti et al. |
| 3,996,388 | 12/1976 | Bellamy et al. |
| 4,020,188 | 4/1977 | Forkner . |
| 4,208,441 | 6/1980 | Westover . |
| 4,246,290 | 1/1981 | Haas et al. |
| 4,386,557 | 6/1983 | Meraj et al. |
| 4,657,769 | 4/1987 | Petrofsky et al. |
| 4,931,301 | 6/1990 | Guiseppe . |
| 4,935,252 | 6/1990 | Huang et al. |
| 5,079,015 | 1/1992 | Herting . |
| 5,171,590 | 12/1992 | Sluimer . |
| 5,256,431 | 10/1993 | Herting . |
| 5,284,672 | 2/1994 | Ito . |
| 5,529,797 | 6/1996 | McKee et al. |
| 5,614,240 | 3/1997 | Young ....................................... 426/505 |

OTHER PUBLICATIONS

Lena E. Sturges, "The Breads Cookbook", pp. 5,30–33, 42–43 and 46, 1976.

Donna Rathmell German, "The Sandwich Maker Cookbook," Bristol Publishing Enterprises, Inc., No date.

Vitantonio Manufacturing Company, Recipe and Instruction Booklet, Mickey & Minnie Sandwich Maker, No date.

*Primary Examiner*—Lien Tran
*Attorney, Agent, or Firm*—Fulbright & Jaworski, LLP

[57] ABSTRACT

A leavened, farinaceous, baked food product having a crust on all sides and a method for producing the product. One embodiment of the leavened, farinaceous, baked food product has a quick bread-like texture and can be stored frozen and later toasted by the consumer without thawing. Alternatively, the product may be stored in a refrigerator and eaten without additional toasting. The product has a thickness and product strength that is suitable for a hand-held food. The product is produced by heating a batter comprising a chemical leavening agent, or a dough comprising a yeast leavening agent or chemical leavening agent or a combination of both, under low pressure in a confined space such that a crust is formed on all sides of the product's exterior.

14 Claims, 4 Drawing Sheets

QUICK BREAD

This application is a continuation-in-part of U.S. application Ser. No. 08/749,681 filed on Nov. 15, 1996 now abandon.

FIELD OF THE INVENTION

This invention relates to a process for producing a toastable leavened farinaceous baked food product having a crust on all sides that has a thickness and product strength that make it a suitable hand-held product that is also suitable for toasting. The process comprises cooking a chemically leavened bread batter having a sweetening agent content of about 8–20% or more, or cooking a yeast leavened dough having a fat content from 0% to about 25% and a sweetening agent content of about 1–15% under low pressure to produce a leavened farinaceous baked food product. The invention also relates to the leavened farinaceous baked food products produced by the process. Further the invention relates to an apparatus for producing the leavened farinaceous baked products of this invention.

BACKGROUND OF THE INVENTION

Toastable, commercially available breads are convenient but do not provide the variety that is sought by many consumers. Toastable ready-to-eat single serve pastry products, while providing convenience and variety, do not provide the homemade texture of a quick-bread desired by consumers. The process disclosed herein uses a chemically-leavened quick-bread batter having a sweetening agent content of about 8–20% to produce a leavened farinaceous baked food product in the shape of a slice of bread that provides the desirable texture of homemade quick bread, a product strength which makes it suitable for toasting and the convenience and variety of commercially available ready-to-eat single serve toastable pastry products. The process described herein can also use a yeast leavened dough having a fat content from about 0% to about 25% and a sweetening agent content of about 1% to 15%.

Three primary factors differentiate types of batters. These factors are: (1) ratio of flour to water; (2) the quality and the quantity of major flour components and; (3) the amounts of all ingredients. Batters represent the starting material for a variety of food products, e.g., cakes, waffles, pancakes, and coatings applied to foods. All of these foods are subsequently cooked in a variety of ways, such as baking, griddle frying and deep fat frying.

Batters and doughs differ in their physical and chemical properties. Batters have flow properties or viscosity and can develop an emulsion. In contrast, a dough has elasticity as a result of gluten developed with energy. Batters will incorporate and trap air during mixing whereas doughs will incorporate carbon dioxide if allowed to ferment. Nonetheless, there are many similarities between doughs and batters, e.g., they each may or may not be leavened.

Waffle batters and yeast leavened doughs differ from quick-bread batters in various ways, such as, e.g., the sugar content. The cooking times for the waffles, bread doughs and quick breads also differ. Waffles cook in 1–2 minutes while dough breads and quick-breads generally require more than 30 minutes to cook. In addition, the cooked products differ in their texture. Cooked waffles and yeast leavened doughs have an airy non-uniform cell structure. In contrast cooked, chemically leavened quick-breads as defined herein have a bread/cake-like texture with generally uniform pores.

Unlike yeast-leavened bread products, chemically-leavened bread products do not require a proofing step before the product is baked. Proofing is the period in which the yeast expands the dough volume and adds significant time to the preparation of the bread product. Typically, proofing is carried out at a temperature in the range of about 27° C. (80° F.) to about 45° C. (113° F.) at a relative humidity in the range of 80–90% for about 10–30 min.

There are various methods known for producing pre-baked bread-like food products but such methods often involve time-consuming steps such as preparing and shaping a dough and extensive baking time. In other methods, the dough is fried and then baked. In still other methods the dough must be tempered to increase its moisture content by, e.g., spraying the partially baked product with a mist or injecting the pre-baked product with steam to increase moisture. In other methods the product must be thawed prior to its consumption or the product must be baked for a relatively long time by the consumer. Microwave defrosting of pre-baked products is undesirable because it can create a hard spot in the center of the product. Conventional quick-breads and muffins are not suitable for toasting because when toasted they cannot be hand-held without crumbling and falling apart.

U.S. Pat. No. 4,746,526 discloses a process for producing a chemically leavened frozen biscuit. The biscuit is prepared from a dough that is cut into preforms and fully baked to form an intermediate product which is then tempered to increase its moisture content, and frozen. The frozen biscuit is then baked by the consumer at about 75° C. (167° F.) without prior thawing.

U.S. Pat. Nos. 4,788,067 and 4,861,601 disclose a process for producing a frozen, pre-proofed and partially baked crusty bread. The final baking steps are completed by the consumer. The process comprises time-consuming steps of preparing and shaping a dough, and then proofing and baking the dough. A critical step in the production of the crusty bread is a second injection of steam into the oven during the partial baking of the product.

U.S. Pat. No. 5,281,433 discloses a process for producing a pre-cooked, microwaveable frozen baked food product having an outer crust. The process comprises preparing, shaping and proofing a dough, then baking the dough from 10 min. to 30 min. and finally freezing and tempering the dough to increase its moisture content.

U.S. Pat. No. 4,122,198 discloses a process for preparing a cooked dough product wherein only minor portions of the surface is toasted and then the product is fried or baked.

None of the aforementioned patents teach or suggest the process of the present invention or the product of this invention, i.e., a leavened, farinaceous, baked food product in the shape of a slice of bread that has a crust on all sides and is suitable for toasting.

SUMMARY OF THE INVENTION

This invention relates to a process for producing a leavened, farinaceous, baked food product and to the product produced by the disclosed process. The process combines waffle making techniques and quick bread batters or doughs to produce a leavened, farinaceous cooked food product having a crust on all sides.

The process disclosed herein comprises the steps of depositing a prepared chemically leavened batter having about 8–20% sweetening agent or a dough into a baking unit having a confined space in the shape of a slice of bread and cooking the batter under low pressure. The raised batter or dough contacts the walls of the confined space for a time sufficient to form a crust on all sides of the product.

The invention further relates to a cooking apparatus useful in producing the leavened farinaceous baked food product. The apparatus comprises a plurality of individual baking units, each unit having a confined baking space in the shape of a slice of bread. The individual baking unit comprises a top half mold means and bottom half mold means which are configured such that together they form the confined baking space in the shape of a slice of bread. The apparatus also comprises a means for the release of pressure that accumulates in the confined baking space as the batter or dough rises and abuts the top half mold means. The cooking apparatus may also comprise a heating means for heating the batter or dough.

DETAILED DESCRIPTION OF THE INVENTION

The process of this invention comprises depositing a prepared batter comprising a chemical-leavening agent and from about 8% to about 20% sweetening agent into a confined baking space configured in the shape of a slice of bread and then heated in the confined space under low pressure to form a leavened, farinaceous, baked food product having a crust on all sides. A batter as defined in this invention is a semi-liquid mixture of flour, water and other ingredients. Once raised and cooked the leavened, farinaceous, baked food product is removed from the baking space and may be packaged and stored, refrigerated or frozen. The product may subsequently be toasted in a conventional toaster by the consumer.

In another embodiment a leavened dough may be placed into the apparatus of this invention to produce a farinaceous baked food product in the shape of a slice of bread with a crust on all sides. A dough as defined in this invention is visco-elastic mixture of flour, water, and other ingredients. A dough that is suitable for this process includes, but is not limited to, sheeted doughs, laminated doughs and extruded doughs. The preferred dough comprises a yeast for leavening, a fat content from about 0% to about 25% and about 1–15% sweetening agent. More preferably, the dough comprises 5–15% fat and 2–8% sweetening agent. The dough may be proofed prior to cooking. Those of skill in the art appreciate that the conditions for proofing a dough will vary depending on the characteristics desired for the finished product. Generally, longer proofing steps will produce a less dense product.

The apparatus of this invention is heated to a temperature from about 150° F. (66° C.) to 450° F. (232° C.). Preferably, the temperature of the apparatus is about 250° F. (121° C.)–350° F. (177° C.). More preferably, the temperature of the apparatus is 300° F. (149° C.)–330° F. (166° C.). Those of skill in the art appreciate that the temperature of the apparatus can be adjusted such that the batter or dough is cooked in 45 sec. to 120 sec. Preferably, the batter or dough is cooked 90 sec. During cooking, the temperature of the batter or dough is about 160° F. (71° C.) to about 250° F. (121° C.). Preferably, the internal temperature of the batter or dough is about 200° F. (93° C.).

Those of skill in the art appreciate that waffle making technology is often considered an art as much as a science and as such would appreciate that the pressure on the product is supplied mostly by the weight of the top half mold means. Preferably, the low pressure is near atmospheric to 5 psig.

Once the product is cooked and the crust has formed on all sides, the product is removed from the confined space. To ease the removal of the product, the baking units may be coated with an agent before, or concurrently with, the depositing of the batter or dough into the confined baking space. Such agents include non-stick substances such as, e.g., butter, margarine, oil, or a spray release agent.

The process may additionally comprise freezing or refrigerating the product after wrapping the slices either individually or in multiples. The product may be frozen at about 0° F. (–18° C.) or refrigerated at 40° F. (4° C.).

Another embodiment of this invention is a leavened, farinaceous, baked food product having a sweetening agent concentration of about 9–22% and having a crust on all sides that is produced by the process disclosed herein. The product has a quick-bread-like texture and a thickness and product strength that make it suitable for toasting and suitable for holding in the hand. The thickness of the product is from about 0.25 inch (6 mm) to about 1.5 inch (38 mm). Preferably, the thickness of the product is from a minimum of about 0.35 inch (9 mm) to a maximum of about 1.0 inch (25 mm). Most preferably, the product is at least 0.5 inch (13 mm) thick. If the product comprises a raised design the maximum thickness from the back face of the slice to the top of the design should be about 1.5 inch (38 mm). Preferably, the maximum thickness is about 1.0 inch (25 mm), more preferably, the maximum thickness is about 0.5 inch (13 mm). If the product comprises an impressed design the minimum thickness from the back face to the bottom of the recessed design should be about 0.25 inch (6 mm), preferably, the minimum thickness is 0.35 inch (9 mm), more preferably, the minimum thickness is 0.5 inch (13 mm).

In another embodiment of this invention, a farinaceous baked food product prepared from a dough having a fat content of 0–25%, preferably 5% to 15% and a sweetening agent concentration of 1–15%, preferably 2 to 8% and having a crust on all sides is produced by the process described herein. The dough-based product has a product strength that makes it suitable for toasting and suitable for holding in the hand. The thickness of the product is about 0.25 inch (6 mm) to about 1.5 inches (38 mm) crust to crust. Preferably, the product thickness is about 0.5 inch (13 mm) to about 0.75 inch (19 mm). If the product comprises an inset design the minimum thickness from the back face to the bottom of the recessed design should be about 0.25 inch (6 mm), preferably the minimum thickness should be 0.35 inch (9 mm).

Those of skill in the art will recognize that a batter or dough useful in this invention may be modified somewhat to fit the needs of the individual. For example, the degree of sweetness or the texture and flavor of the final product may be modified by altering the proportion of the ingredients in the batter or dough. Those of skill in the art will appreciate that if an artificial sweetener were used in the product the amount should be such that it is sufficient to provide the degree of sweetness provided by the sugar concentration described herein. The batter preferred in this invention comprises a chemical leavening agent, a flour, a sweetening agent, an oil, a salt and egg. The dough preferred in this invention comprises a yeast leavening agent, although in some embodiments a chemical leavening agent or a combination of a chemical leavening agent and a yeast leavening agent may be suitable, a flour, a sweetening agent, a fat source, a salt, egg, and flavoring.

The percentages of the various batter and dough ingredients disclosed hereafter are relative to the total weight of the batter or dough.

The batter comprises a chemical leavening agent. Preferably, the chemical leavening is selected from the group consisting of baking soda (sodium bicarbonate) or baking powder commonly containing sodium bicarbonate and an acid, e.g., sodium acid pyrophosphate, and sodium aluminum phosphate (SALP). The chemical leavening agent may be present in the batter at a concentration of from about 0.5% to about 4%. Preferably, the batter comprises 1% to 2% chemical leavening agent. The batter comprises baking soda in an amount from about 0.5% to about 2% and baking powder in an amount from about 0.5% to about 3%.

The batter also comprises a salt or a salt substitute. Preferably, the salt or salt substitute is present in an amount from about 0.5% to about 3%.

The batter also comprises a flour such as, wheat, rye, corn, barley, rice, oat, buckwheat, or potato. Preferably, the flour is a blend of both hard and soft wheat flours having a protein range from about 7% to about 20% more preferably, the protein range is 10% to 15% (on a 14% moisture basis). The concentration of flour may be about 20% to about 50% of the batter. Preferably, the flour is 30% to 40% of the batter.

The batter may comprise a sweetening agent. Preferably, the sweetening agent is a sugar selected from the group consisting of sucrose, fructose, dextrose, and a corn syrup. The sweetening agent may be present at a concentration which is from about 8% to about 20%. Preferably, the sweetening agent is present at a concentration of about 10% to about 12% of the batter weight.

The batter further comprises egg or an egg substitute, which may be liquefied. Preferably, the batter comprises 3% to 10% egg or egg substitute to total batter weight. Most preferably, the batter comprises 4% to 8% egg or egg substitute.

The dough comprises a yeast leavening agent. The yeast leavening agent as defined herein may be any yeast that is used in conventional dough making methods including, but not limited to, compressed fresh cake yeast, active dry yeast, instant dried yeast, cream yeast and the like. Preferably, the dough comprises 0.25–2.5% yeast leavening agent, preferably about 0.75% to about 1.5% yeast leavening agent.

The dough may also comprise a salt or a salt substitute. Preferably, the salt or salt substitute is present in an amount from about 0.5% to about 2.5%.

The dough also comprises a flour such as, wheat, rye, corn, barley, rice, oat, buckwheat, or potato. Preferably, the flour is a blend of both hard and soft wheat flours having a protein range from about 7% to about 20% more preferably the protein range is 10% to 15% (on a 14% moisture basis).

The concentration of flour may be about 20% to about 60% of the dough. Preferably, the flour is about 40% to about 60% of the dough.

The dough may comprise a sweetening agent. Preferably, the sweetening agent is a sugar selected from the group consisting of sucrose, fructose, dextrose, and a corn syrup. The sweetening agent may be present at a concentration which is from about 1% to about 15%. Preferably, the sweetening agent is present at a concentration of about 2% to about 8% of the dough.

The dough may further comprise egg or an egg substitute, which may be liquefied. Preferably, the dough comprises 0% to 10% egg or egg substitute to total dough weight. Most preferably, the dough comprises 2% to 5% egg or egg substitute.

In addition, the batter or dough may comprise a number of other ingredients depending on the needs of the individual. For example, the batter or dough may comprise flavorings, e.g., fruits and fruit extracts, and raisins as described in U.S. Pat. No. 5,439,692, incorporated herein in its entirety by reference, nuts, and chocolate; colorings; preservatives, such as, e.g., sorbic acid, benzoic acid, sodium propionate and combinations and salts thereof; vitamins, such as vitamin A palmitate, niacinamide, iron, vitamin B12, vitamin B1, vitamin B6, vitamin B2, folic acid, and calcium phosphate; cereal nuggets or pieces; minerals; a fiber source, e.g., psyllium as described in U.S. Pat. No. 5,384,136 incorporated herein in its entirety by reference; dairy products, e.g., butter, sweet cream, sour cream, buttermilk, heavy or light cream; vegetables products, e.g., carrot, zucchini or pumpkin; corn meal; spices, e.g., cinnamon, ginger, allspice, nutmeg; herbs; grains, either whole or ground, cooked or uncooked, and; seeds, either whole or ground, e.g., poppy seeds, cardamon seeds, or sesame seed.

Those of skill in the art appreciate that modifications can be made to produce a shelf-stable product. Such modifications include for example adding to or incorporating into the product any preservatives well-known in the art or modified atmospheric packaging of the product.

The raised, cooked, leavened, farinaceous food product may also comprise a filling, such as a fruit or nut filling, or a topping, such as an icing. The fillings and toppings may be added either pre-baking or post-baking. For example, bits of the topping may be sprinkled on a mold half prior to adding the batter or dough to the bottom mold half. Alternatively, only part of the total batter or dough may be deposited into the bottom mold half, the filling may then be deposited on top of the batter or dough and the remaining batter or dough deposited over the filling. The filling or topping may also be mixed with the batter or dough prior to inserting the batter or dough into the bottom mold half. In another embodiment, the filling may be inserted into the product or the topping added to the surface of the product after the product has been cooked. Alternatively, the dough may be sheeted and the other ingredients, such as nuts, fruits, fillings, etc., may be spread onto the dough and the dough rolled up and sliced forming a jelly roll-like product, which may be proofed prior to cooking in the baking apparatus.

This invention also describes a cooking apparatus useful for raising and cooking a batter or dough under low pressure to produce a leavened, farinaceous, baked food product having a crust on all sides. The cooking apparatus may be constructed of any conventional composition that is suitable for baking food products, e.g., aluminum, cast iron and Teflon-coated metal alloys.

The cooking apparatus comprises a plurality of individual baking units for producing a raised, cooked food product in the shape of a slice of bread having a crust on all sides. The individual baking units comprise a bottom half mold means having a depression for receiving a batter and a top half mold means also having a depression. The cooking apparatus also comprises: a delivery means for depositing the batter or dough into the depression of the bottom half; and, a positioning means for positioning the top and bottom half mold means to form the confined baking space in the shape of a slice of bread. Either the bottom or top half mold means may additionally comprise a raised or imbedded design provided the minimum thickness of the batter-based leavened, farinaceous baked food product produced in this apparatus is at least 0.25 inch (6 mm) and the maximum thickness of the product is about 1.5 inch (38 mm). If a dough is used for the product, it is preferable that any design is an embedded design. Preferably, the cooked product produced from a batter in the apparatus has a thickness of about 0.35 inch (9 mm) to about 1.0 inch (25 mm) and, more preferably, the cooked product in the apparatus has a thickness of about 0.5 inch (13 mm). For a dough-based the leavened, farinaceous baked food product is the minimum thickness is at least 0.25 inch (6 mm) and the maximum thickness of the product is about 1.5 inch (38 mm). Preferably, the thickness of product is 0.5 inch (13 mm) to 0.75 inch (19 mm). The weight of the top half mold means is the source of the low pressure. The bottom half means depression is configured such that it is capable of containing from about 20 g to about 120 g of batter or dough. Preferably, the depression is sufficient to hold about 60 g of a batter or about 80 g of dough.

The cooking apparatus further comprises a heating means for heating the batter or dough. The heating means may be internal or external to the cooking apparatus. For example, the heating means may be imbedded in the top and bottom half means or the cooking apparatus may be placed inside an oven.

The bottom and top half means may be adapted to be separated slightly by the raised product during cooking. Such adaptation may be accomplished by, e.g., a hinged grid that can move vertically. In a further embodiment of the invention, the bottom and top half means are adapted to vent gasses released during cooking. The bottom and top half means may vent the gasses at their margins.

Figure 1:
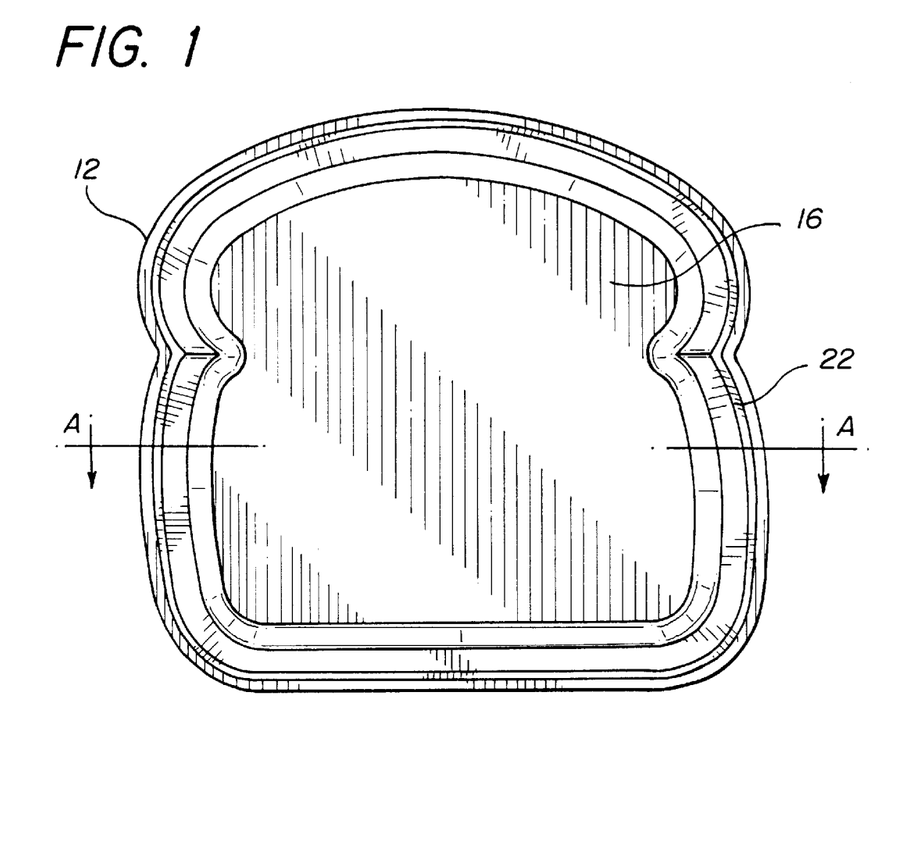
FIG. 1 is a plan view of the bottom half mold means of an individual baking unit of the cooking apparatus.
Figure 2:
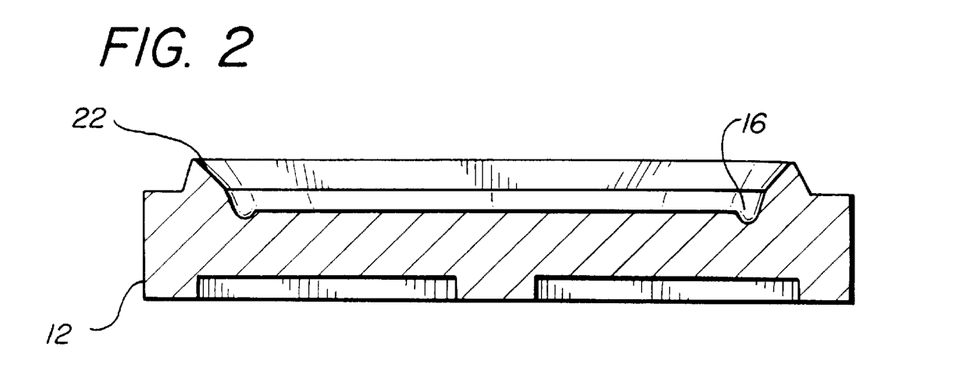
FIG. 2 is a cross-sectional view of the bottom half mold means taken along line A—A of FIG. 1.
Figure 3:
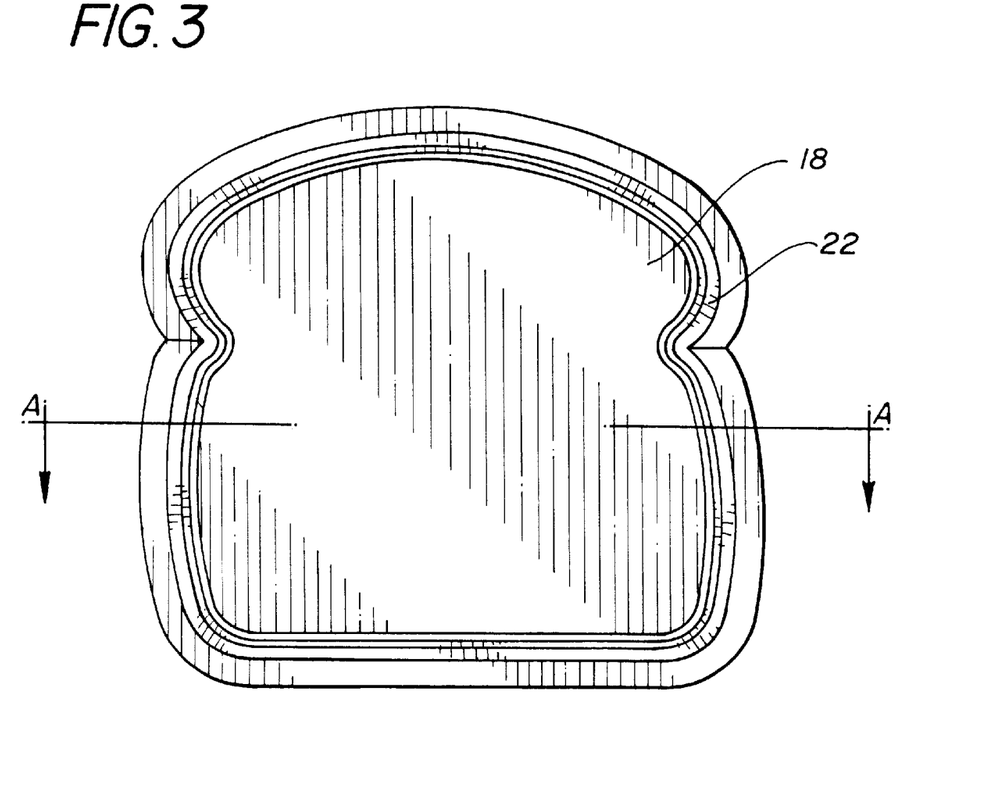
FIG. 3 is a plan view of the top half mold means of an individual baking unit of the cooking apparatus.
Figure 4:
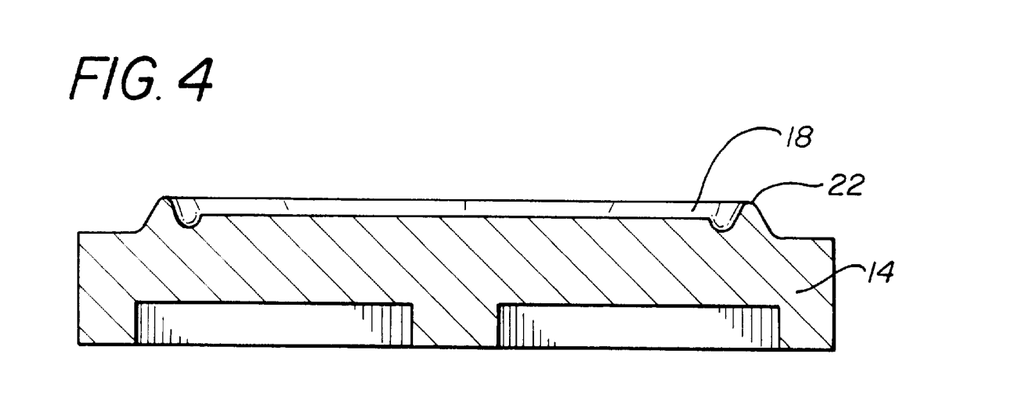
FIG. 4 is a cross-sectional view of top half mold means taken along line A—A of FIG. 3.
Figure 5:
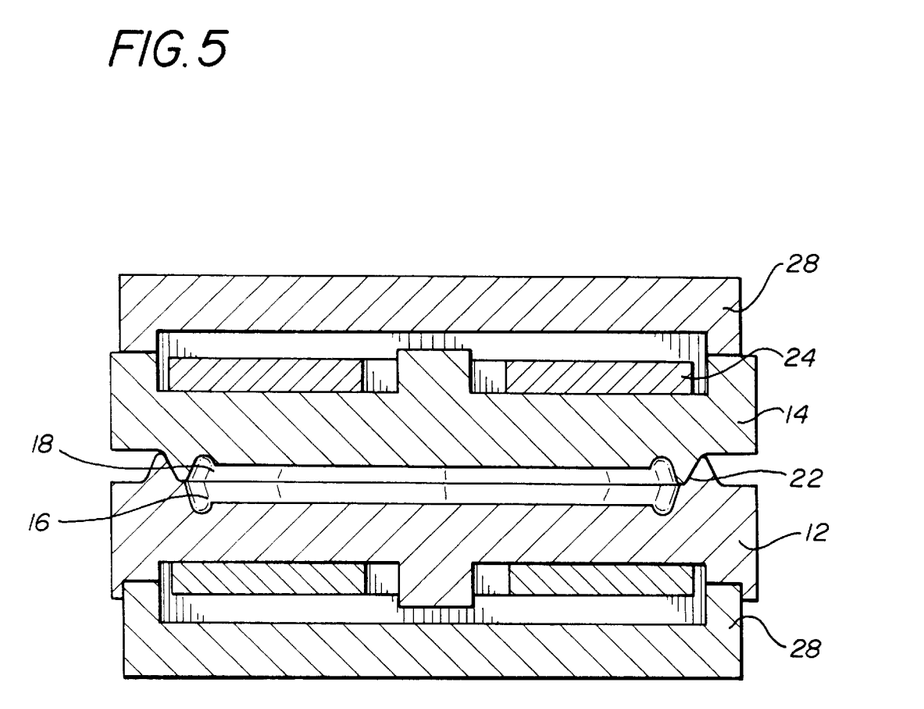
FIG. 5 is a cross-sectional view of the top half mold means of FIG. 4 positioned with the bottom half mold means shown in FIG. 2 to form a confined baking space taken along line A—A in FIGS. 2 and 4.

Referring to the drawings, FIG. 1 depicts a bottom half mold means 12 having separation means 22 and a depression in the shape of a slice of bread 16 for holding a batter. FIG. 2 depicts a cross-sectional view of the bottom half mold means 12 along line A—A in FIG. 1. FIG. 3 depicts a top half mold means 14 having separation means 22 and a depression in the shape of a slice of bread 18. FIG. 4 depicts a cross-sectioned view of the top half mold means along line A—A in FIG. 3. The cooking apparatus further comprises a positioning means for positioning the top half mold means 14 and the bottom half mold means 12 to form the confined baking space there between in the shape of a slice of bread (FIG. 5). The confined space is of such a size that the heated raised batter or dough abuts the top half means, wherein the top half means is the source of low pressure.

The bottom half means 12 and the top half means 14 comprise an imbedded heating means 24 to heat the top and bottom half means and heat the batter to form a raised, cooked bread-like food product. The individual baking unit also comprises a back plate 28.

Figure 6:
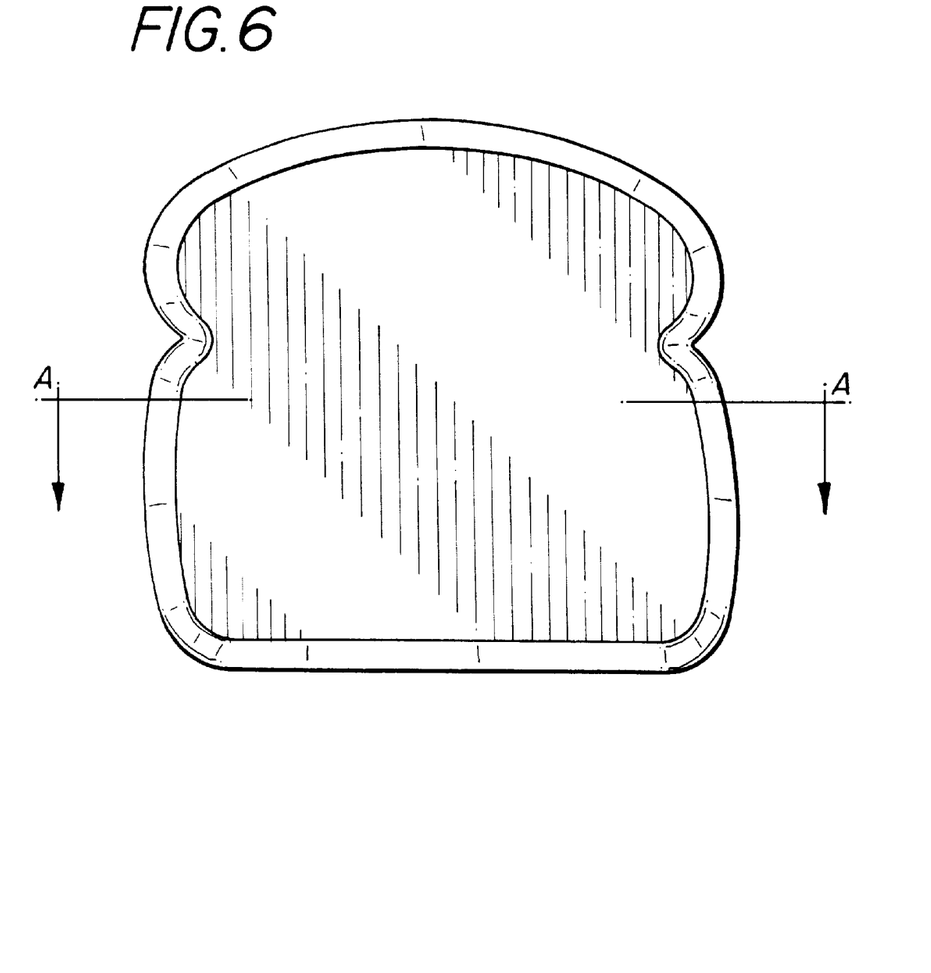
FIG. 6 is a plan view of the cooked product produced in the confined cooking space.
Figure 7:
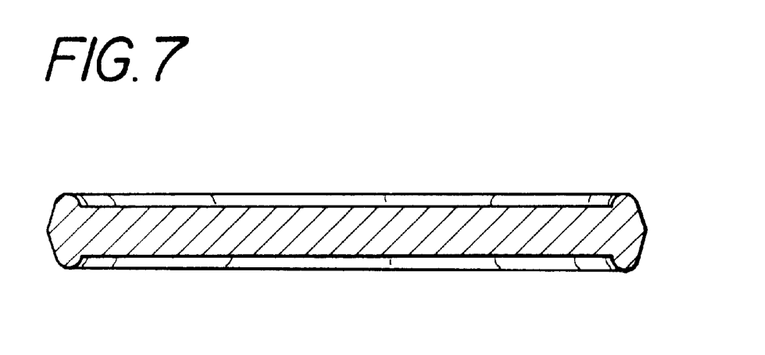
FIG. 7 is a cross-sectional view of the cooked product along line A—A in FIG. 6.

Those of skill in the art appreciate that various configurations of bread slices e.g., circular, rectangular, disk-shaped or the like which is suitable for toasting are available and are contemplated within the scope of this invention. Preferably, the shape of the confined space is the shape depicted in FIG. 6.

EXAMPLE 1

|  | % By Weight | Grams |
|---|---|---|
| Water | 31.95% | 479.25 |
| Hard wheat flour | 25.40% | 381.00 |
| Soft wheat flour | 6.35% | 95.25 |
| Oil | 7.84% | 117.60 |
| Whole egg | 5.23% | 78.45 |
| Granulated sugar | 12.00% | 180.00 |
| Whey powder | 1.56% | 23.40 |
| Baking soda | 0.64% | 9.60 |
| Salt | 0.52% | 7.80 |
| Baking powder | 0.67% | 10.05 |
| Vitamin mix | 0.04% | 0.60 |
| Poppy seeds | 2.50% | 37.50 |
| Sour Cream | 4.00% | 60.00 |
| Lemon extract | 0.80% | 12.00 |
| Flavoring | 0.50% | 7.50 |
| Totals | 100.00% | 1500.00 |

Dry ingredients (flour(s), sugar(s), salt, leaveners, vitamins) were blended in a 1 quart Hobart bowl. The liquid ingredients (water, egg, oil(s), fruits, flavors, etc.) were added to the blended dry ingredients and beat with a whip for 2 minutes on second speed in a Hobart mixer. The poppy seeds were added to the beaten liquid and dry ingredients and then mixed for an additional 15 seconds on second speed in the Hobart mixer. Approximately, 60 g of batter was deposited into the bottom half means of an individual baking unit, and the top half means of the baking unit was positioned relative to the bottom half means such that together the top and bottom half means formed a confined baking space. The bottom and top half means were pre-heated to about 315° F. (157° C.) to 330° F. (166° C.) prior to inserting the batter. The batter was heated for 90 seconds in the confined space of the baking unit having a temperature of 315° F. (157° C.)–330° F. (166° C.). The cooked product prior to cooling was approximately 57 g. The cooked product was cooled. The weight of the cooled product was approximately 55 g. The cooked product was then frozen at 0° F. and stored frozen.

The products of this invention cannot be produced in a conventional waffle iron. 49–50 g of the lemon poppy seed batter disclosed in Example 1 was deposited into a conventional waffle iron which was heated to 315° F. (157° C.) to 330° F. (166° C.) and cooked for 60 seconds. After 60 seconds the product was inspected. The product adhered to both sides of the waffle iron and the center of the product did not cook. The cooking time was increased to 90 seconds. After 90 seconds the product was partially cooked in the middle but the edges of the product were overcooked. The product texture was characteristic of a "puffer" or a "pull-apart." These terms define a product having a large cavity in the center of the product and the product is not palatable and not suitable for selling to the consumer.

Increasing the quantity of the batter to 60 g or reducing the cooking temperature by about 30° F.–35° F. (about 1° C.) to about 270° F. 275° F. (about 133° C.) did not solve the aforementioned problems. Conventional waffle irons do not possess the capacity to hold 60 g of batter. The excess batter oozes out the sides of the waffle iron. The remaining batter in the waffle iron was cooked at the reduced temperature for 90 seconds and after 90 seconds, the product was inspected.

The product browned on the outside, but still had the characteristics of a "pull-apart", i.e., it had a central cavity which made it unpalatable and not suitable for sale.

EXAMPLE 2

|  | % By Weight | Grams |
|---|---|---|
| Water | 3.92% | 508.80 |
| Hard wheat flour | 9.42% | 441.30 |
| Oil | 7.00% | 105.00 |
| Whole egg | 5.23% | 78.45 |
| Crystalline fructose | 2.00% | 30.00 |
| Granulated sugar | 8.00% | 120.00 |
| Whey powder | 1.56% | 23.40 |
| Baking soda | 0.64% | 9.60 |
| Salt | 0.52% | 7.80 |
| Baking powder | 0.67% | 10.05 |
| Vitamin mix | 0.04% | 0.60 |
| Walnuts | 3.00% | 45.00 |
| Carrots - ¼" dried | 2.00% | 30.00 |
| Pineapple | 4.00% | 60.00 |
| Spices | 1.50% | 22.50 |
| Flavorings | 0.50% | 7.50 |
| Totals | 100.00% | 1500.00 |

The dry ingredients (flour(s), sugar(s), salt, leaveners, vitamins) were blended in a 1 quart Hobart bowl. The liquid ingredients (water, egg, oil(s), fruits, flavors/spices, etc.) were added to the blended dry ingredients. The carrots were hydrated in water and added to the liquid and blended dry ingredients and beat with a whip for 2 minutes on second speed in a Hobart mixer. The walnuts were added to the beaten ingredients and were mixed for an additional 15 seconds on second speed in a Hobart mixer. Approximately 60 grams of batter were inserted into bottom half means of an individual baking unit and the top half means of the baking unit was positioned relative to the bottom half means such that together the top and bottom half means formed a confined baking space. The bottom and top half means were pre-heated to about 315° F. (157° C.) to 330° F. (166° C.) prior to inserting the batter. The batter was heated for 90 seconds in the confined space of the baking unit at having a temperature of 315° F.–330° F. (157° C.–166° C.). The cooked product was then frozen at 0° F. and stored frozen. The cooked product prior to cooling was approximately 57 g. The cooked product was cooled. The weight of the cooled product was approximately 55 g.

EXAMPLE 3

|  | % By Weight | Grams |
|---|---|---|
| Water | 29.57% | 443.55 |
| Hard wheat flour | 5.00% | 75.00 |
| Oil | 7.00% | 105.00 |
| Whole egg | 5.23% | 78.45 |
| Granulated sugar | 12.00% | 180.00 |
| Whey powder | 1.56% | 23.40 |
| Baking soda | 0.64% | 9.60 |
| Salt | 0.52% | 7.80 |
| Baking powder | 0.67% | 10.05 |
| Vitamin mix | 0.04% | 0.60 |
| Dried fruit | 3.00% | 45.00 |
| Nuts | 2.00% | 30.00 |
| Pumpkin | 8.50% | 127.50 |
| Cornmeal | 3.00% | 45.00 |
| Whole wheat flour | 20.16% | 302.40 |
| Spices | 1.1% | 16.65 |
| Totals | 100.00% | 1500.00 |

The dry ingredients (flour(s), sugar(s), salt, leaveners, vitamins) were blended in a 1 quart Hobart bowl. The liquid ingredients (water, egg, oil(s), etc.) were added to the blended dry ingredients and beat with a whip for 2 minutes on second speed in a Hobart mixer. The dried fruit and nuts were added to the beaten ingredients and were beaten for an additional 15 seconds on second speed in a Hobart mixer. Approximately 60 grams of batter were deposited into the bottom half means of an individual baking unit and the top half means of the baking unit was positioned relative to the bottom half means such that together the top and bottom half means formed a confined baking space. The bottom and top half means were pre-heated to about 315° F. (157° C.) to 330° F. (166° C.) prior to depositing the batter. The batter was heated for 90 seconds in the confined space of the baking unit having a temperature of 315° F.–330° F. (157° C.–166° C.). The cooked product was then frozen at 0° F. (–18° C.) and stored frozen. The cooked product prior to cooling was approximately 57 g. The cooked product was cooled. The weight of the cooled product was approximately 55 g.

EXAMPLE 4

| Sweet Yeast Dough | % By Weight | Grams |
|---|---|---|
| Hard wheat flour | 24.0% | 500.00 |
| Soft wheat flour | 24.0% | 500.00 |
| Sugar | 4.8% | 100.00 |
| Dry malt powder | 0.34% | 50.00 |
| Whole egg | 2.4% | 50.00 |
| Active dry yeast | 1.2% | 25.00 |
| Milk (2% fat) | 24.0% | 500.00 |
| Water | 3.6% | 75.00 |
| Salt | 1.0% | 20.00 |
| Flavorings | 0.2% | 4.00 |
| Butter (full fat) | 14.4% | 300.00 |
| Totals | 99.9% | 2124.00 |

Dry ingredients, hard wheat flour, soft wheat flour, sugar, dry malt powder, whole egg, and instant active dry yeast, were blended in a 12-quart Hobart mixer with a dough hook. The milk and water were warmed to 95–100° F. (35° C.–37° C.) and mixed into the dry ingredients by mixing at first speed for 1 minute, then at second speed for 6 minutes. Salt and flavorings were added during the last minute of mixing.

Butter was added to the blended ingredients and mixing was continued on second speed for 4–5 minutes or until all the butter was incorporated into the dough and the dough no longer adhered to the mixing bowl. The final dough temperature was 77° F. (25° C.). The dough was proofed for 1–1.5 hours at 90° F. (32° C.) and 90% RH. The dough was cut in half, and sheeted to a thickness of about 0.25 inch (6 mm) to about 0.38 (10 mm). The sheeted dough was brushed with melted butter or water, and a filling (20% by weight of the dough) was evenly spread across the dough sheet. The dough was rolled up and the seam sealed to obtain a 3–3.5" (76 mm to 8.9 mm) diameter roll. The roll was sliced to obtain rounds of 75–80 grams dough and filling. The dough slices were placed on a baking sheet and proofed for 10–15 minutes at 90° F. (32° C.) and 90% RH. The dough was placed in a cooking apparatus pre-heated at 300° F.–320° F. (148° C.–160° C.) and heated for 90 seconds. The cooked product was then frozen at 0° F. (–18° C.) and stored frozen.

EXAMPLE 5

| Raisin Filling | % By Weight | Grams |
| --- | --- | --- |
| Crushed Bran Flakes | 39.7% | 100.00 |
| Sugar | 19.8% | 50.00 |
| Spices | 0.8% | 2.00 |
| Raisins | 39.7% | 100.00 |
| Totals | 100.00% | 252.00 |

The bran flakes were crushed and blended with the other ingredients by hand to form a filling.

EXAMPLE 6

| Nut Filling | % By Weight | Grams |
| --- | --- | --- |
| Powdered Bran Flakes | 41.7% | 100.00 |
| Spices | 0.6% | 1.50 |
| Sugar | 16.0% | 38.50 |
| Nuts | 41.7% | 100.00 |
| Totals | 100.0% | 240.00 |

The bran flakes were powered. All ingredients were then blended by hand to form a filling.

We claim:

1. Process for producing toastable leavened, farinaceous, baked food product having a crust on all sides and a thickness of at 0.25 inch to 1.5 inches comprising:
   (i) inserting a quick-bread batter comprising a chemical leavening agent and a sweetening agent into a confined baking space configured like a slice of bread;
   (ii) heating the batter in said confined space under low pressure for 45 to 120 sec to form a raised, cooked, leavened, farinaceous food product having a crust on all sides; and,
   (iii) removing the raised, cooked, leavened, farinaceous food product from the baking space.

2. Process of claim 1 wherein the pressure in the baking space is from about near atmospheric to about 5 psig.

3. Process of claim 1 wherein the temperature of the confined baking space is about 300° F. to about 330° F.

4. Process of claim 1 further comprising freezing the leavened farinaceous baked product.

5. Process of claim 1 wherein the baking space is treated with an agent to prevent sticking of the leavened, farinaceous, baked food product to the baking space.

6. Process of claim 1 wherein the batter is heated for about 45 sec. to about 120 sec. in the confined baking space having a temperature of about 315° F. to about 330° F.

7. Process of claim 1 wherein the temperature of the confined baking space is about 150° F. to about 450° F.

8. A process for producing toastable leavened, farinaceous, baked food product having a crust on all sides and a thickness of about 0.25 inch to 1.5 inches comprising:
   (i) depositing a dough comprising a yeast leavening agent, sweetening agent and a source of fat into a confined baking space configured like a slice of bread;
   (ii) heating the dough in said confined space under low pressure for about 45 sec to about 120 sec to form a raised, cooked, leavened, farinaceous food product having a crust on all sides; and,
   (iii) removing the raised, cooked, leavened, farinaceous food product from the baking space.

9. The process of claim 8 wherein the pressure in the baking space is from about near atmospheric to about 5 psig.

10. The process of claim 8 wherein the temperature of the confined baking space is about 300° F. to about 330° F.

11. The process of claim 8 further comprising freezing the leavened farinaceous baked product.

12. The process of claim 8 wherein the baking space is treated with an agent to prevent sticking of the leavened, farinaceous, baked food product to the baking space.

13. The process of claim 8 wherein the dough is heated for about 45 sec. to about 120 sec. in the confined baking space having a temperature of about 300° F. to about 330° F.

14. Process of claim 8 wherein the temperature of the confined baking space is about 150° F. to about 45° F.

* * * * *